United States Patent
Goel et al.

(10) Patent No.: US 9,299,123 B2
(45) Date of Patent: Mar. 29, 2016

(54) INDEXED STREAMOUT BUFFERS FOR GRAPHICS PROCESSING

(71) Applicant: QUALCOMM Incorporated, San Diego, CA (US)

(72) Inventors: Vineet Goel, La Jolla, CA (US); Andrew Evan Gruber, Arlington, MA (US)

(73) Assignee: QUALCOMM Incorporated, San Diego, CA (US)

( * ) Notice: Subject to any disclaimer, the term of this patent is extended or adjusted under 35 U.S.C. 154(b) by 172 days.

(21) Appl. No.: 14/160,324

(22) Filed: Jan. 21, 2014

(65) Prior Publication Data

US 2014/0204080 A1    Jul. 24, 2014

Related U.S. Application Data

(60) Provisional application No. 61/755,381, filed on Jan. 22, 2013.

(51) Int. Cl.
- *G06T 1/20* (2006.01)
- *G06T 15/00* (2011.01)
- *G06T 1/60* (2006.01)

(52) U.S. Cl.
CPC ... *G06T 1/20* (2013.01); *G06T 1/60* (2013.01); *G06T 15/005* (2013.01)

(58) Field of Classification Search
None
See application file for complete search history.

(56) References Cited

U.S. PATENT DOCUMENTS

| | | | |
|---|---|---|---|
| 7,928,989 B1* | 4/2011 | Brown | G06T 15/04 345/501 |
| 2005/0243094 A1 | 11/2005 | Patel et al. | |
| 2008/0114939 A1* | 5/2008 | Mouton | G06F 12/0895 711/128 |
| 2009/0109219 A1* | 4/2009 | DeCoro | G06T 17/205 345/423 |
| 2009/0189909 A1* | 7/2009 | Jiao | G06T 1/60 345/506 |
| 2011/0141122 A1* | 6/2011 | Hakura | G06T 1/00 345/505 |
| 2011/0234592 A1* | 9/2011 | Patel | G06T 15/005 345/426 |
| 2012/0229464 A1 | 9/2012 | Fishwick | |
| 2013/0113790 A1* | 5/2013 | Kazakov | G06T 15/005 345/419 |
| 2013/0265309 A1 | 10/2013 | Goel et al. | |
| 2014/0181071 A1* | 6/2014 | Pidduck | G06F 17/30117 707/711 |

OTHER PUBLICATIONS

Jayasena, Nuwan, et al. "Stream register files with indexed access." Software, IEE Proceedings-. IEEE, 2004.*

* cited by examiner

*Primary Examiner* — Tize Ma
*Assistant Examiner* — Yu Chen
(74) *Attorney, Agent, or Firm* — Shumaker & Sieffert, P.A.

(57) ABSTRACT

A graphics processing unit (GPU) includes an indexed streamout buffer. The indexed streamout buffer is configured to: receive vertex data of a primitive, and determine if any entries in a reuse table of the indexed streamout buffer reference the vertex data. Responsive to determining that an entry of in the reuse table references the vertex data, the buffer is further configured to: generate an index that references the vertex data, store the index in the buffer, and store a reference to the index in the reuse table. Responsive to determining that an entry does not reference the vertex data, the indexed streamout buffer is configured to: store the vertex data in the buffer, generate an index that references the vertex data, store the index in the buffer, and store a reference to the index in the reuse table.

20 Claims, 8 Drawing Sheets

Input primitives

GEOMETRY SHADER OUTPUT FROM FIG. 4B

Output of GS for input primitive P1, P2, P3

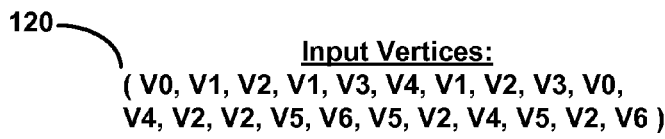

FIG. 5A

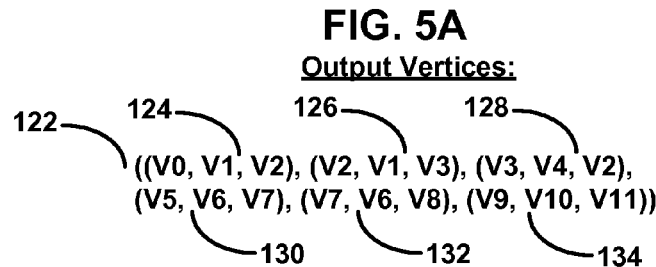

FIG. 5B

| Output primitive | Reuse Table | Indices Written | Vertices Written | Index filled size | Buffer filled size | Indices Written | Primitives Written |
|---|---|---|---|---|---|---|---|
|  | x x x x |  |  |  |  |  |  |
| V0 V1 V2 | I0 I1 I2 | I0 I1 I2 | V0 V1 V2 | 3 | 3V | 3 | 1 |
| V2 V1 V3 | I0 I1 I2 I3 | I2 I1 I3 | V3 | 6 | 4V | 6 | 2 |
| V3 V4 V2 | I4 I1 I2 I3 | I3 I4 I2 | V4 | 9 | 5V | 9 | 3 |
| V5 V6 V7 | I4 I5 I6 I7 | I5 I6 I7 | V5 V6 V7 | 12 | 8V | 12 | 4 |
| V7 V6 V8 | I8 I5 I6 I7 | I7 I6 I8 | V8 | 15 | 9V | 15 | 5 |
| V9 V10 V11 | I8 I9 I10 I11 | I9 I10 I11 | V9 V10 V11 | 18 | 12V | 18 | 6 |

FIG. 5C

```
NON-INDEXED              INDEXED STREAMOUT BUFFER
STREAMOUT BUFFER                    29
      142
                         INDEX          VERTEX
                         STORAGE        STORAGE
                         144            146
      V0
      V1                 I0             V0
      V2                 I1             V1
      V2                 I2             V2
      V1                 I2             V3
      V3                 I1             V4
      V3                 I3             V5
      V4                 I3             V6
      V2                 I4             V7
      V5                 I2             V8
      V6                 I5             V9
      V7                 I6             V10
      V7                 I7             V11
      V6                 I7
      V8                 I6
      V9                 I8
      V10                I9
      V11                I10
                         I11
```

FIG. 5D

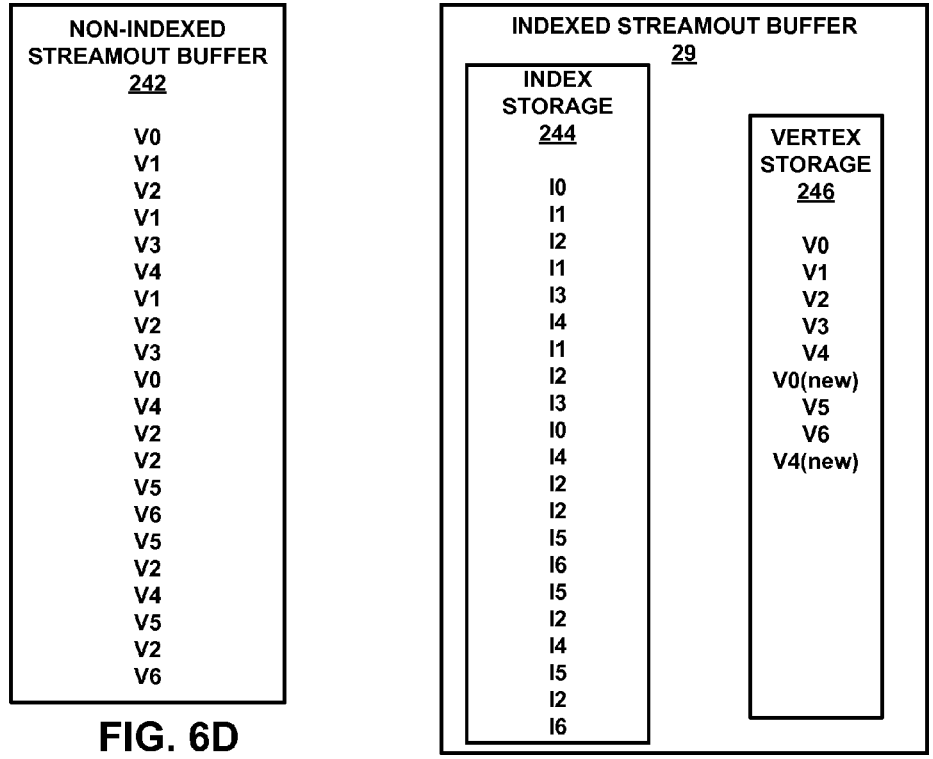

300 g_pd3dDevice->CreateBuffer( &bufferDesc, &InitData, &g_pVertexBuffer );

302 g_pd3dDevice->DrawAutoIndexed( &g_pVertexBuffer, primType );

FIG. 7

INDEXED STREAMOUT BUFFERS FOR GRAPHICS PROCESSING

This application claims the benefit of U.S. Provisional Application No. 61/755,381, filed 22 Jan. 2013, the entire content of which is incorporated herein by reference.

TECHNICAL FIELD

This disclosure relates to stitching of primitives in graphics processing, and more particularly, to buffering techniques in a graphics processing unit (GPU).

BACKGROUND

A graphics processing unit (GPU) may implement a graphics rendering pipeline to render image data. The graphics rendering pipeline may include multiple stages, comprising programmable units and fixed function units that may operate on vertex data and store the vertex data in one or more different types of buffers. The vertex data may include 3-D coordinates, such as x, y, and z-coordinates. The vertex data may also include perspective data and other attributes.

SUMMARY

In general, the techniques described in this disclosure are directed to implementing an index streamout buffer useful for streaming out vertex coordinates stored in the index buffer. In accordance with the techniques of this disclosure, the indexed buffer may receive vertex coordinates for a strip of a particular primitive type. The index buffer of a GPU may receive, from a pipeline stage of the GPU, a vertex of a primitive to be stored in an index streamout buffer. The index buffer may determine if the vertex is already stored in the index buffer, responsive to determining that the vertex is already stored in the index buffer, the index buffer may store an index value that references the already-stored vertex in the index buffer. Responsive to determining that the vertex is not already stored in the index buffer, the index buffer may store the received vertex in the index buffer, generate an index value that references the stored vertex, and storing the generated index value in the index buffer. The index buffer may be further configured to streamout the stored vertex in the indexed buffer to a pipeline stage of the GPU.

In one example, the disclosure describes a method performed by a graphics processing unit (GPU) comprising receiving, by an indexed streamout buffer, vertex data of a primitive, determining, by the indexed streamout buffer, if any entries in a reuse table of the indexed streamout buffer reference the vertex data, storing, by the indexed streamout buffer, the index in the indexed streamout buffer, and responsive to determining that an entry of the entries currently stored in the reuse table does not reference the vertex data: storing, by the indexed streamout buffer, the vertex data in the indexed streamout buffer, and storing, by the indexed streamout buffer, a reference to the stored index in the reuse table of the indexed buffer.

In another example, the disclosure describes a graphics processing unit (GPU) comprising at least one processor, a memory, and an indexed streamout buffer. The indexed streamout buffer is configured to: receive vertex data of a primitive, determine if any entries in a reuse table of the indexed streamout buffer reference the vertex data, generate an index that references the vertex data, store the index in the indexed streamout buffer, and responsive to determining that an entry of the entries currently stored in the reuse table does not reference the vertex data: store the vertex data in the indexed streamout buffer, and store a reference to the stored index in the reuse table of the indexed buffer.

In another example, the disclosure describes a non-transitory computer-readable storage medium having stored thereon instructions that upon execution cause at least one processor to receive vertex data of a primitive, determine if any entries in a reuse table of an indexed streamout buffer reference the vertex data, generate an index that references the vertex data, store the index in the indexed streamout buffer, responsive to determining that an entry of the entries currently stored in the reuse table does not reference the vertex data: store the vertex data in the indexed streamout buffer, and store a reference to the stored index in the reuse table of the indexed buffer.

The details of one or more examples are set forth in the accompanying drawings and the description below. Other features, objects, and advantages will be apparent from the description and drawings, and from the claims.

BRIEF DESCRIPTION OF DRAWINGS

FIG. 5A is a conceptual diagram illustrating an input set of vertices.

FIG. 5B is a conceptual diagram illustrating an output set of vertices.

FIG. 5C is a conceptual diagram illustrating a table that details the operation of an indexed streamout buffer in accordance with the techniques of this disclosure.

FIG. 5D is a conceptual diagram illustrating the contents of a non-indexed streamout buffer and an indexed streamout buffer.

FIG. 6A is a conceptual diagram illustrating an input set of vertices.

FIG. 6B is a conceptual diagram illustrating an output set of vertices.

FIG. 6C is a conceptual diagram illustrating a table that details the operation of an indexed streamout buffer in accordance with the techniques of this disclosure.

FIG. 6D is a conceptual diagram illustrating the contents of a non-indexed streamout buffer and an indexed streamout buffer.

FIG. 7 is an illustration of a sample draw call that illustrates application programming interface techniques for utilizing an indexed streamout buffer in accordance with the techniques of this disclosure.

DETAILED DESCRIPTION

Figure 1:
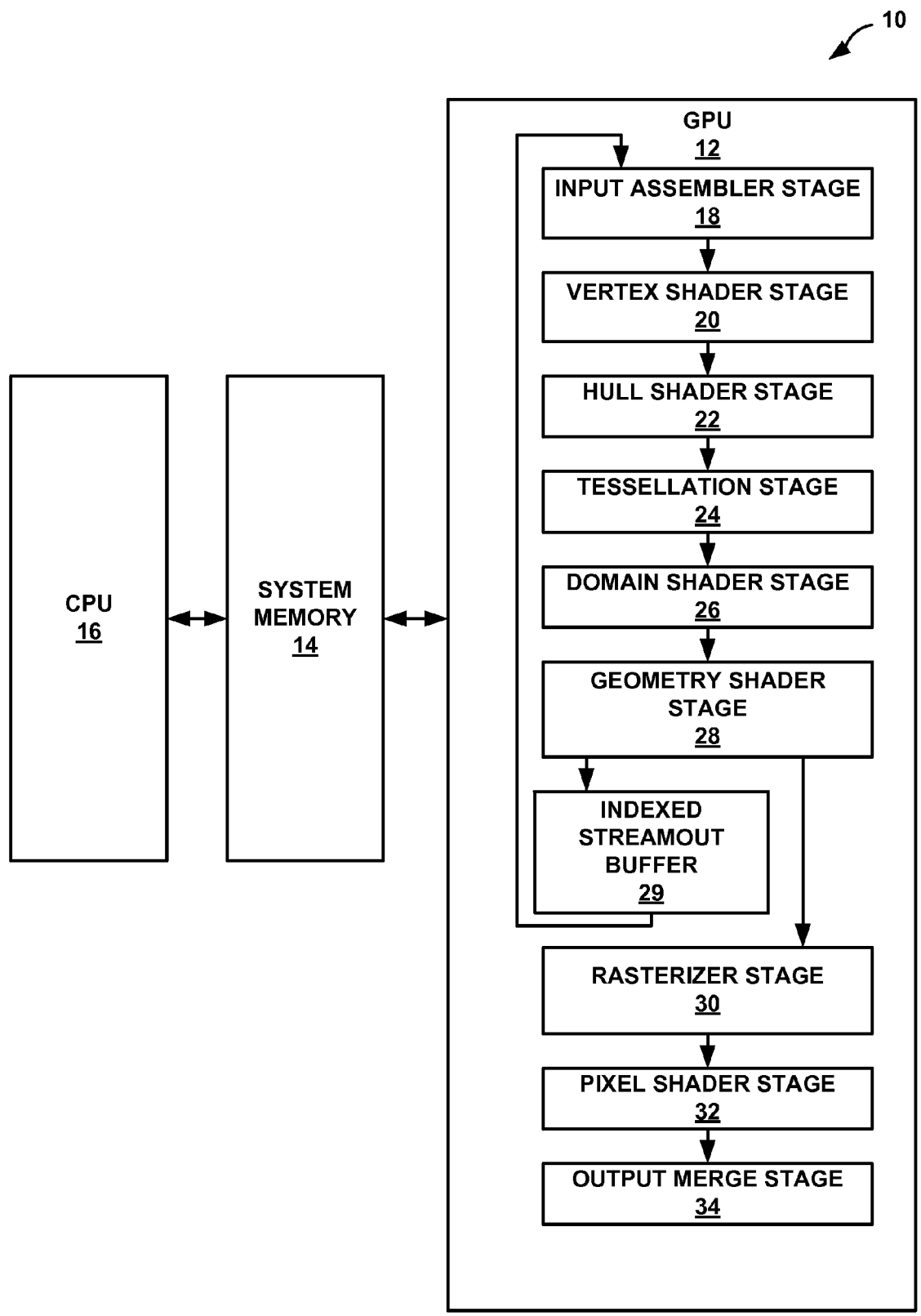
FIG. 1 is a block diagram illustrating an example of a graphics processing unit (GPU) that may implement an example of a graphics processing pipeline in accordance with one or more examples described in this disclosure.

Modern mobile devices, such as laptop computer, tablet computers, smartphones, and digital media players, may include a CPU (Central Processing Unit), a graphics processing unit (GPU) and system memory. When rendering graphics as part of executing an application, the CPU may transmit instructions and graphics data to the GPU. In some examples, the graphics data may be in the form of vertices, which may comprise one or more data structures that describes a point in 2D or 3D space.

The application executing on the CPU may communicate with the GPU in accordance with an application programming interface (API). For instance, the application may communicate with the GPU in accordance with the DirectX® API developed by Microsoft® or the OpenGL® and OpenGL ES®API developed by the Khronos Group, as two examples. For purposes of illustration and to ease with understanding, the techniques described in this disclosure are generally described in the context of the DirectX and OpenGL APIs. However, aspects of this disclosure should not be considered limited to the DirectX and OpenGL APIs, and the techniques described in this disclosure may be extended to other APIs as well.

DirectX and OpenGL each define graphics processing pipelines that are to be implemented by a GPU. These graphics processing pipelines may include a combination of programmable stages, as well as fixed-function stages. Some recent versions of the APIs, such as the Direct3D 11 API and the OpenGL 4.x API, include a tessellation process that is to be performed by the GPU.

Some graphics rendering stages may compute the vertices of primitives comprising one or more polygons, which may eventually be rasterized and output by the GPU for display. In some examples, the vertices output from one stage, e.g., a geometry shader, may be stored in an output buffer (referred to as a "streamout buffer"). In some examples, an indexed streamout buffer of the GPU may "streamout," i.e. read or make available, the contents of the streamout buffer to an input assembler stage for another rendering pass. The streamout buffer may streamout the vertex data stored in the streamout buffer so that a programmer can debug the graphics rendering process.

When streaming out data from the streamout buffer, the vertices of each of the primitives may be streamed out in a specific order. In some examples, the vertices of one primitive may also be included in one or more primitives that are also streamed out. The techniques of this disclosure are directed to an indexed streamout buffer that reduces the vertex data storage requirements of the streamout buffer. In some examples, the indexed streamout buffer may also reduce the memory bandwidth requirements and power consumption associated with the streamout buffer.

An indexed streamout buffer, as described in this disclosure, may be useful for tile-based graphics rendering architectures. Tile-based rendering architectures generally involve two passes through the GPU's pipeline for graphics to be rendered: (1) a binning pass and (2) a rendering pass. The GPU reuses the output of the binning pass as the input to the rendering pass. Once the GPU completes the rendering pass, the GPU may output the rendered contents of the framebuffer for display.

In tile-based rendering, the same vertices may be repeatedly written to a vertex buffer. An indexed streamout buffer may reduce the storage requirements associated with requests to storing the same vertex data to an indexed buffer. An indexed streamout buffer may also reduce the bandwidth required to output the vertices stored in the indexed streamout buffer from the binning pass to the input assembler stage as input to the rendering pass.

In some situations, it may be more advantageous to utilize an indexed streamout buffer, as opposed to a non-indexed streamout buffer. To specify when an indexed streamout buffer should be used, the techniques of this disclosure also include an API call that configures a GPU graphics pipeline to use an indexed streamout buffer. The draw call may be part of an API, such as OpenGL, DirectX, OpenCL, etc.

FIG. 1 is a block diagram illustrating an example of a graphics processing unit (GPU) that may implement an example of a graphics processing pipeline that includes an indexed streamout buffer in accordance with one or more examples described in this disclosure. FIG. 1 illustrates device 10 that includes graphics processing unit (GPU) 12, system memory 14, and central processing unit (CPU) 16. Examples of device 10 include, but are not limited to, mobile wireless telephones, video gaming consoles that include video displays, mobile video conferencing units, laptop computers, tablet computers, desktop computers, television set-top boxes, and the like.

CPU 16 may execute various types of applications. Examples of the applications include operating systems, web browsers, e-mail applications, spreadsheets, video games, or other applications that generate viewable objects for display. Instructions for execution of the one or more applications may be stored within system memory 14. CPU 16 may transmit graphics data of the generated viewable objects to GPU 12 for further processing.

For example, GPU 12 may be specialized hardware that allows for massive parallel processing, which functions well for processing graphics data. In this way, CPU 16 offloads graphics processing that is better handled by GPU 12. CPU 16 may communicate with GPU 12 in accordance with a particular application processing interface (API). Examples of such APIs include the DirectX® API by Microsoft® and the OpenGL® by the Khronos group; however, aspects of this disclosure are not limited to the DirectX and the OpenGL APIs, and may be extended to other types of APIs that have been developed, are currently being developed, or are to be developed in the future.

Figure 2:
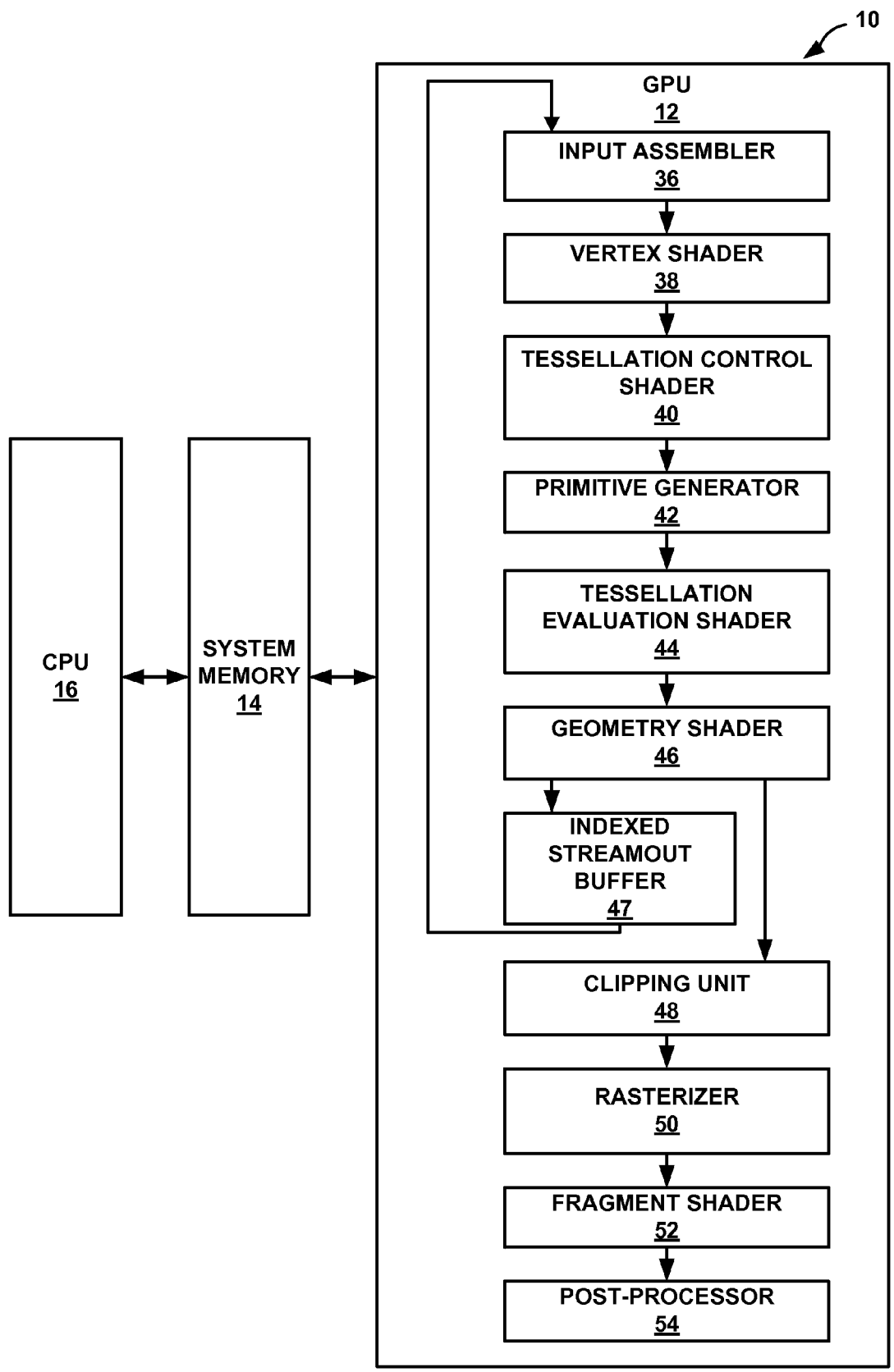
FIG. 2 is a block diagram illustrating another example of a graphics processing unit (GPU) that may implement another example of a graphics processing pipeline in accordance with one or more examples described in this disclosure.

In addition to defining the manner in which GPU 12 is to receive graphics data from CPU 16, the APIs may define a particular graphics processing pipeline that GPU 12 is to implement. GPU 12, in FIG. 1, illustrates the graphics processing pipeline defined by the Direct3D 11 API. As described in more detail, FIG. 2 illustrates the graphics processing pipeline of the OpenGL 4.x API.

Examples of CPU 16 and GPU 12 include, but are not limited to, a digital signal processor (DSP), general purpose microprocessor, application specific integrated circuit (ASIC), field programmable logic array (FPGA), or other equivalent integrated or discrete logic circuitry. In some examples, GPU 12 may be specialized hardware that includes integrated and/or discrete logic circuitry that provides GPU 12 with massive parallel processing capabilities suitable for graphics processing. In some instances, GPU 12 may also include general purpose processing, and may be referred to as a general purpose GPU (GPGPU).

System memory 14 may comprise one or more computer-readable storage media. Examples of system memory 14 include, but are not limited to, a random access memory (RAM), a read only memory (ROM), an electrically erasable programmable read-only memory (EEPROM), flash memory, or any other medium that can be used to carry or store desired program code in the form of instructions and/or data structures and that can be accessed by a computer or a processor.

In some aspects, system memory 14 may include instructions that cause CPU 16 and/or GPU 12 to perform the functions ascribed to CPU 16 and GPU 12 in this disclosure. Accordingly, system memory 14 may be a computer-readable storage medium comprising instructions that cause one or more processors, e.g., CPU 16 and GPU 12, to perform various functions.

System memory 14 may, in some examples, be considered as a non-transitory storage medium. The term "non-transitory" may indicate that the storage medium is not embodied in a carrier wave or a propagated signal. However, the term "non-transitory" should not be interpreted to mean that system memory 14 is non-movable. As one example, system memory 14 may be removed from device 10, and moved to another device. As another example, a system memory, substantially similar to system memory 14, may be inserted into device 10. In certain examples, a non-transitory storage medium may store data that can, over time, change (e.g., in RAM).

The execution of the applications on CPU 16 may cause CPU 16 to generate a plurality of primitives that connect together to form the viewable content. Examples of the primitives include points, lines, triangles, squares, or any other type of polygon. CPU 16 may define these primitives by their respective vertices. For example, CPU 16 may define coordinates and color values for the vertices. The coordinate values may be three-dimensional (3D) coordinates or 2D coordinates.

To perform graphics operations, GPU 12 may implement a graphics processing pipeline. Executing a graphics processing pipeline may include performing functions as defined by software or firmware executing on GPU 12 and performing functions by fixed-function units that are hardwired to perform very specific functions. The software or firmware executing on the GPU 12 may be referred to as shaders, and the shaders may execute on one or more shader cores of GPU 12. Shaders provide users with functional flexibility because a user can design the shaders to perform desired tasks in any conceivable manner. The fixed-function units, however, are hardwired for the manner in which the fixed-function units perform tasks. Accordingly, the fixed-function units may not provide much functional flexibility.

As indicated above, the graphics processing pipeline illustrated in FIG. 1 is a graphic processing pipeline substantially as defined by Direct3D 11. In this example, GPU 12 may include one or more of input assembler stage 18, vertex shader stage 20, hull shader stage 22, tessellation stage 24, domain shader stage 26, geometry shader stage 28, indexed streamout buffer 29, rasterizer stage 30, pixel shader stage 32, and output merge stage 34. GPU 12 may include more stages than those illustrated, and in some examples, GPU 12 may not necessarily include all of the illustrated stages. Also, the specific ordering of the stages is provided for purposes of illustration and should not be considered limiting.

Input assembler stage 18 may read primitive data, e.g., patches, points, lines and/or triangles from system memory 14 as defined by CPU 16, and assemble the control points to form primitives that can be used by other stages of the graphics processing pipeline of GPU 12. For instance, input assembler stage 18 may read the coordinates, color values, and other such information of the primitive data. Input assembler stage 18 may also assemble vertices into primitive types, such as patches, line lists, or triangle strips. The coordinates, color values, and other such information may be commonly referred to as attributes of the primitive. Based on the attributes of the control points, input assembler stage 18 may determine the general layout of the primitive. In this manner, input assembler stage 18 may assemble the primitive. Input assembler stage 18 may also read control point data from system memory 14. The control points may be used during the stages used to implement tessellation of a patch comprising the control points. Input assembler stage 18 may be a fixed-function unit.

Vertex shader stage 20 may process the vertices from input assembler stage 18. For example, vertex shader stage 20 may perform per-vertex operations such as transformations, skinning, morphing, and per-vertex lighting. Vertex shader 20 may receive compiled shaders written in a language such as high level shader language (HLSL) and execute the instructions and/or flow control of the compiled shaders on the vertices. Vertex shader stage 20 may be a programmable unit, as opposed to fixed function units, such as input assembler 18, etc.

Hull shader stage 22 is one of three stages (along with tessellation stage 24 and domain shader 26) that implements tessellation of a patch comprising a number of control points. Hull shader stage 22 receives control points of a patch, as processed by vertex shader stage 20, processes the control points, and outputs control points for a processed patch. In other words, hull shader stage 22 receives an input patch, as processed by vertex shader stage 20, processes the input patch, and outputs an output patch. Hull shader stage 22 may perform various functions for processing the input patch. For example, hull shader stage 22 may modify the coordinates of the control points to change the locations of the control points, or may even add or delete control points.

In addition, hull shader stage 22 may determine values that indicate how many primitives are to be added to the patch generated by hull shader stage 22 (i.e., the output patch). Hull shader stage 22 may utilize various criteria to determine how many primitives are to be added to the patch. Described below are two example criteria that hull shader stage 22 may utilize to determine how many primitives are to be added to the patch. However, aspects of this disclosure are not so limited, and hull shader stage 22 may utilize any criteria to determine how many primitives should be added to the patch.

As one example, hull shader stage 22 may utilize information indicative of the depth of the patch to determine how many primitives should be added. For instance, a patch that is further away, from the perspective of the viewer, may not need high resolution because objects further in distance appear blurry in real life. However, a patch that is closer, from the perspective of the viewer, may need higher resolution because objects closer in distance appear sharper in real life. In this example, hull shader stage 22 may determine that fewer primitives should be added to the patch that is further away, and more primitives should be added to the patch that is closer, relative to one another.

As another example, hull shader stage 22 may determine how many primitives should be added based on the size of the patch. For a smaller sized patch, hull shader stage 22 may determine that fewer primitives should be added because the patch encompasses a smaller area. For a larger sized patch, hull shader stage 22 may determine that more primitives should be added because the patch encompasses a larger area.

Based on a determination of how many primitives should be added, hull shader stage 22 may output a domain type and values that indicate how many primitives are to be added to the patch to tessellation stage 24. The values that indicate how many primitives are to be added to the patch, in the Direct3D 11 API, are referred to as tessellation factors (e.g., tessfactors).

The domain may be a considered as a template shape that tessellation stage 24 uses for tessellation purposes. Examples of the domain type include a line, a triangle, a quad (e.g., a four sided polygon), or any other type of polygon. The domain may be a two-dimensional (2D) shape, even if the patches define a three-dimensional (3D) surface or a 2D surface. When the domain is a line, the domain may be a one-dimensional (1D) shape (i.e., a line), even if the patches define a 3D surface, a 2D surface, or a 1D surface. For purposes of illustration, the techniques described in this disclosure are described with respect to the domain being a 2D surface. For instance, the techniques are described with domain shapes that are the triangle or quad.

In some examples, hull shader stage 22 may not explicitly indicate the domain type. Rather, tessellation stage 24 may determine the domain type based on the number of transmitted tessfactors. For example, the presence of four tessfactors may indicate that the domain type is a triangle domain type, and the presence of six tessfactors may indicate that the domain type is a quad domain type.

In some examples, a quad domain may be defined by 2D Cartesian coordinates (u, v). In some examples, a triangle domain may be defined by Barycentric coordinates. Barycentric coordinates utilize three coordinates to identify any point within the triangle. In other examples, it may be possible to define the quad domain with Barycentric coordinates or Cartesian coordinates, and the triangle domain with Cartesian coordinates or Barycentric coordinates. In general, a domain, of any type, may be defined using any coordinate system.

Tessellation stage 24 may tessellate (e.g., divide) the domain into a plurality of primitives. It should be understood that, in this example, tessellation stage 24 is not dividing the patch outputted by hull shader stage 22 into primitives, but rather dividing the domain into the primitives. In some examples, tessellation stage 24 may not even have access to the patch outputted by hull shader stage 22. Tessellation stage 24 may be a fixed-function unit, although aspects of this disclosure need not be so limited.

Tessellation stage 24 may output the vertices of the plurality of primitives of the domain to domain shader stage 26 in the normalized coordinate system (e.g., the u, v coordinates or the u, v, w coordinates, as applicable). The function of domain shader stage 26 may be to map the vertex coordinates, as received from tessellation stage 24, on to the patch. For example, while tessellation stage 24 may not receive information of the patch as defined by hull shader stage 22, domain shader stage 26 may receive such information from hull shader stage 22.

Domain shader stage 26 may execute for each vertex coordinate outputted by tessellation stage 24. With the coordinates of the control points of the patch from hull shader stage 22, domain shader stage 26 may determine the location of the vertex, as outputted by tessellation stage 24, on the patch. Because tessellation stage 24 outputs vertices of the plurality of primitives generated by tessellation stage 24, and domain shader stage 26 adds these primitives to the patch, the combination of hull shader stage 22, tessellation stage 24, and domain shader stage 26 together add additional primitives to the patch. This results in a mesh of primitives that are added to the patch creating a higher resolution, more detailed patch, as compared to the patch defined by CPU 16. In this manner, hull shader stage 22, tessellation stage 24, and domain shader stage 26 implement a tessellation process.

Geometry shader stage 28 receives the vertices of the primitives added to the patch by domain shader stage 26 and may further generate additional vertices for the primitives to add even more resolution. Rasterizer stage 30 receives the primitives from geometry shader stage 28 and converts the primitives into pixels for the display. For example, the primitives may be defined as vectors that indicate the interconnection of the primitives, and may be defined in a coordinate space that is independent of the display on which the image is to be displayed. Rasterizer stage 30 converts these vectors into the display coordinates, and performs any additional functions such as removing points within primitives that are occluded.

In some examples, Geometry shader stage 28 may output vertices to indexed streamout buffer 29 or to rasterizer stage 30. The streamout buffer may streamout the vertices stored in the buffer to input assembler stage 18. The streamout buffer may also streamout the vertices stored for debugging, e.g. to CPU 16. Although described as receiving vertex data from geometry shader stage 28, the streamout buffer may be positioned after other stages in the graphics pipeline of GPU 12, e.g., after vertex shader 20.

Indexed streamout buffer 29 ("indexed streamout buffer 29") may comprise an indexed buffer in accordance with one or more techniques of this disclosure. An indexed buffer is a particular type of buffer that may store indices or pointers to data in the buffer in order to avoid having to store multiple copies of the same piece of data. In embodiments in accordance with the techniques of this disclosure, indexed streamout buffer 29 may receive and store vertex data, e.g. vertex coordinates, such as x, y, and/or z-coordinates in the vertex buffer.

When GPU 12 is configured to store and streamout vertex data in indexed streamout buffer 29, logic in indexed buffer 29 determines whether vertices to be written to indexed streamout buffer 29 are currently stored in indexed streamout buffer 29. If the vertex data is not currently stored in the vertex buffer, indexed streamout buffer 29 stores the vertex data in streamout buffer 29, and also stores an index that points to the vertex data in indexed streamout buffer 29. If the vertex data is already stored in the vertex buffer, indexed streamout buffer 29 does not write the vertex data to indexed streamout buffer 29, and writes an index that points to, or references the vertex data to indexed streamout buffer 29.

Whenever GPU 12 writes vertex data to indexed streamout buffer 29, logic in indexed streamout buffer 29 also writes the index pointing to that vertex to a reuse table of indexed streamout buffer 29. The reuse table stores a number of recently-stored index values. The storage logic in indexed streamout buffer 29 checks the reuse table to determine whether a particular vertex is stored in indexed streamout buffer 29. By limiting the number of entries in the reuse buffer, the storage logic only compares the vertex data to be written against the limited number of indices in the reuse table, which may reduce the power consumption, and/or number of comparisons required to determine whether a particular vertex is stored in indexed streamout buffer 29. Further details of indexed streamout buffer 29 are described in greater detail below with respect to FIG. 4.

In some examples, an application running on GPU 12 may specify a "DrawAutoIndexed" mode of operation for the indexed streamout buffer by executing a DrawAutoIndexed( ) method. The DrawAutoIndexed method may operate in a manner similar to the DrawAuto( ) method of the DirectX API. The DrawAuto( ) method is a method that may be invoked by an application once work has been processed by the stages of a GPU rendering pipeline, and stored in a streamout buffer for reuse. If the streamout buffers are bound or configured to streamout data to the input assembler in a subsequent rendering pass, the DrawaAuto( ) method handles the details of transmitting data stored in the streamout buffers back to the input assembler stage for further processing without requiring the application to specify the amount of data that is contained in the streamout buffer. In some examples, the DrawAuto Indexed method may receive as an input argument, a primitive type. The primitive type may be a primitive type such as a point, line, triangle, quad, curve, or another primitive type, etc.

In a similar manner to the DrawAuto method, a GPU configured in the DrawAutoIndexed method may inspect the contents of streamout buffer 70 if streamout buffer 70 is bound to (i.e., configured to streamout to) input assembler stage 18. GPU 12 then provides the appropriate number of vertices and primitives to the input assembler to render the entire contents of the buffer, with no interaction from the application or program executing on GPU 12. The DrawAutoIndexed mode may reduce the CPU interaction needed to manage the graphics processing pipeline of GPU 12. The DrawAutoIndexed mode may also be useful for saving values output from geometry shader 28 and for avoiding performing costly vertex transformations for vertices that require further processing by the shader stages in the graphics processing pipeline.

To consume (i.e., streamout) the vertices stored in the indexed streamout buffer, an application may utilize the DrawAutoIndexed method. To utilize the DarwAutoIndexed method, a primitive type, e.g., a triangle, must be specified for the indexed streamout buffer. During the streamout process, GPU 12 fetches the vertices for the specified primitive type based on the indices stored in the indexed streamout buffer and vertices stored in the reuse table. GPU 12 reads out the vertices from the indexed streamout buffer in the order specified by the indexed streamout buffer until all the vertices of all the primitives stored in the indexed streamout buffer have been read out, which may be based on the indexfilledsize value. Additional details of reading from and writing to RB 66 and streamout buffer 70 are described further below with respect to FIGS. 6A-6B, and 7A-7B.

In accordance with the techniques of this disclosure, indexed streamout buffer 29 may be configured to receive vertex data of a primitive, determine if any entries in a reuse table of the indexed streamout buffer reference the vertex data, generate an index that references the vertex data, store the index in the indexed streamout buffer, and responsive to determining that an entry of the entries currently stored in the reuse table does not reference the vertex data: store the vertex data in the indexed streamout buffer, and store a reference to the stored index in the reuse table of the indexed buffer.

Pixel shader stage 32 receives the pixels as outputted by rasterizer stage 30 and performs post processing to assign color values to each of the pixels that are to be displayed. For example, pixel shader stage 32 may receive constant values stored in system memory 14, texture data stored in system memory 14, and any other data to generate per-pixel outputs such as color values. Pixel shader stage 32 may also output opacity values that indicate the opaqueness of the pixels.

Output merge stage 34 may perform any final pixel processing. For example, output merge stage 34 may utilize depth information to further determine whether any of the pixels should be removed from being displayed. Output merge stage 34 may also perform blending operations to generate final pixel values.

Output merge stage 34 may output the final pixel values to a frame buffer, generally located within system memory 14, but which may be located within GPU 12. A display processor (not shown) may retrieve the pixel values from the frame buffer and cause pixels of a display (not shown) of device 10 to illuminate accordingly to the pixel values to cause the display to display the image.

Accordingly, in some examples, the techniques described in this disclosure may increase the computational efficiency of the graphics processing pipeline of GPU 12, relative to the case where indexed streamout buffer 29 is not an indexed streamout buffer. Utilizing an indexed streamout buffer may reduce the vertex memory storage requirements, memory bandwidth, and power consumption relative to using a non-indexed streamout buffer.

FIG. 2 is a block diagram illustrating another example of a graphics processing unit (GPU) that may implement another example of a graphics processing pipeline that includes an indexed streamout buffer in accordance with one or more examples described in this disclosure. For instance, FIG. 1 illustrated a graphics processing pipeline formulated substantially in accordance with the Direct3D 11 API. FIG. 2 illustrates the graphics processing pipeline substantially in accordance with the OpenGL 4.x API.

The OpenGL 4.x graphics processing pipeline may function in a substantially similar fashion as the Direct3D 11 graphics processing pipeline. Accordingly, for purposes of brevity, reference is made to FIG. 1 to describe components that are similar to both the Direct3D 11 graphics processing pipeline and the OpenGL 4.x graphics processing pipeline.

As illustrated in the example of FIG. 2, GPU 12 includes input assembler 36, vertex shader 38, tessellation control shader 40, primitive generator 42, tessellation evaluation shader 44, geometry shader 46, indexed streamout buffer 47, clipping unit 48, rasterizer 50, fragment shader 52, and postprocessor 54. Similar to FIG. 1, in the example illustrated in FIG. 2, GPU 12 may include more or fewer components than those illustrated in FIG. 2. Also, the specific ordering of the unit is provided for purposes of illustration and should not be considered limiting.

In some ways, the tessellation process with the OpenGL 4.x graphics processing pipeline may be substantially similar to the tessellation process with the Direct3D 11 graphics processing pipeline. For example, OpenGL 4.x tessellation process may rely upon patches and control points, in the manner similar to that described above with respect to FIG. 1. For instance, input assembler 36 and vertex shader 38 of FIG. 2 may function substantially similar as input assembler stage 18 and vertex shader stage 20 of FIG. 1, respectively.

As more examples, for tessellation, indexed streamout buffer 47 of FIG. 2 may function substantially similarly to indexed streamout buffer 29 of FIG. 1. For example, indexed streamout buffer 47 may be configured to stream vertices to input assembler 36 or for debugging. Primitive generator 42 may function in a substantially similar manner as tessellation stage 24.

Tessellation evaluation shader 44 of FIG. 2 may function substantially similarly to domain shader stage 26 of FIG. 1. For example, tessellation evaluation shader 44 may receive the vertices of the generated primitives from primitive generator 42 and add the primitive to the patch outputted by tessellation control shader 40. In this manner, the graphics processing pipeline of the OpenGL 4.x API may perform tessellation on a patch to increase the resolution of the patch.

Geometry shader 46 may function substantially similar to geometry shader stage 28. Geometry shader 46 may output vertices to streamout buffer 47. In some examples, streamout buffer 47 may be an indexed streamout buffer, and may streamout vertices to input assembler 36. Although illustrated as being positioned after geometry shader 46, streamout buffer 47 may also be positioned after vertex shader 38, as an example.

The combination of clipping unit 48 and rasterizer 50, in FIG. 2, may function substantially similarly to rasterizer stage 30 in FIG. 1. Fragment shader 52 and post-processor 54 in FIG. 2 may function substantially similar to pixel shader stage 32 and output merge stage 34 in FIG. 1, respectively. Post-processor 54 may output the final pixel values to a frame buffer and the display processor may retrieve the pixel values from the frame buffer and cause a display to illuminate according to the pixel values to display the image.

As described above, tessellation control shader 40, primitive generator 42, and tessellation evaluation shader 44 of FIG. 2 function substantially similar to hull shader stage 22, tessellation stage 24, and domain shader stage 26 of FIG. 1, respectively, for implementing the tessellation process. Accordingly, both the Direct3D 11 and the OpenGL 4.x APIs rely upon two programmable shader units and one fixed-function unit to implement the tessellation process.

Figure 3:
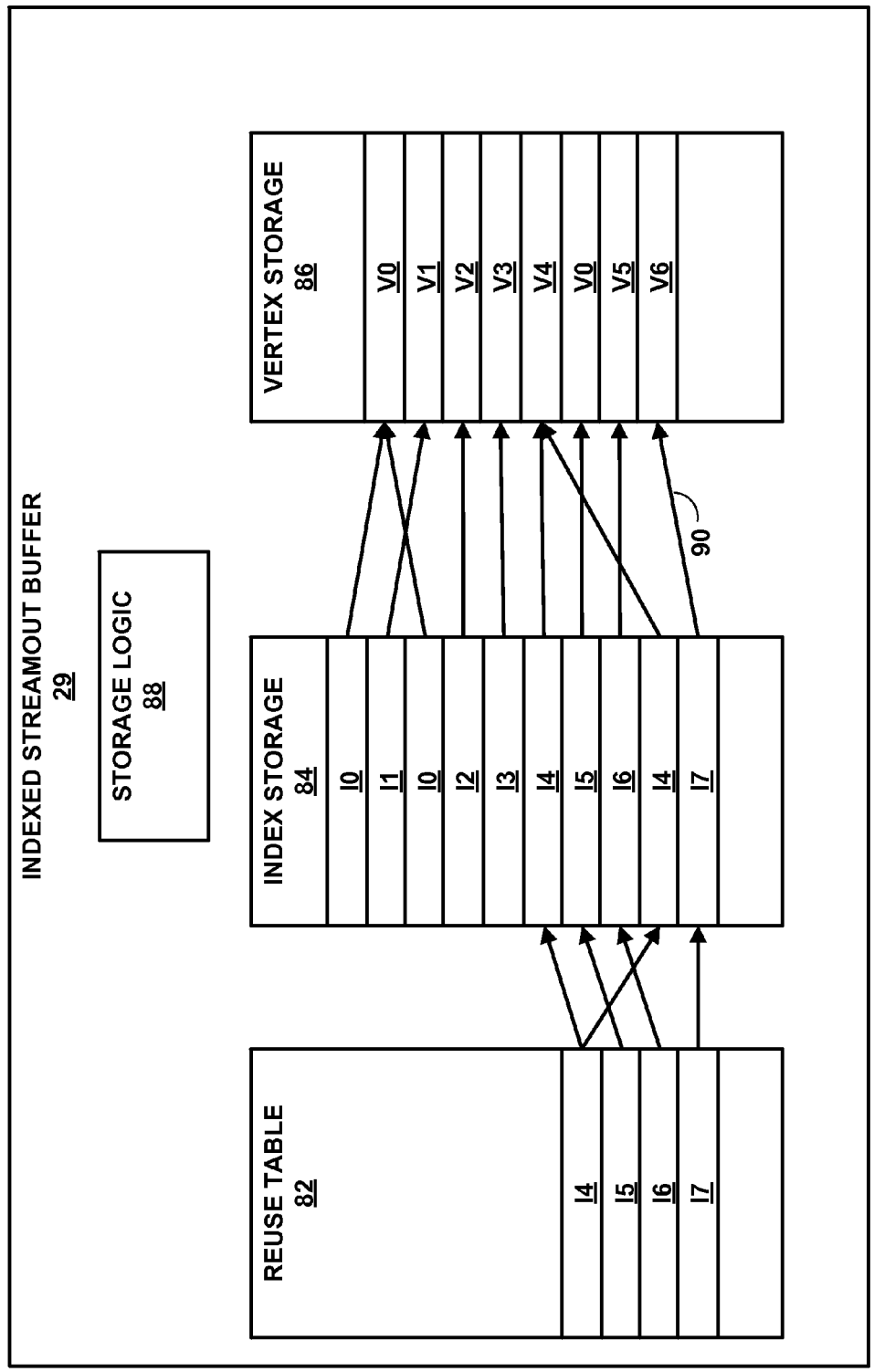
FIG. 3 is a block diagram that illustrates an indexed streamout buffer in accordance with the techniques of this disclosure.

FIG. 3 is a block diagram that illustrates an indexed streamout buffer in accordance with the techniques of this disclosure. FIG. 3 illustrates indexed streamout buffer 29, as illustrated in FIG. 1. Indexed streamout buffer 29 may also be similar to streamout buffer 47 (FIG. 2). Indexed streamout buffer 29 includes a reuse table 82, index storage 84, vertex storage 86, and storage logic 88.

Vertex storage 86 illustrates a portion of streamout buffer 29 designed to store vertex data, i.e. two-dimensional (x,y) coordinate pairs, and/or three-dimensional (x,y,z) coordinate pairs. In addition to storing vertex data, vertex storage 86 may also be configured to store other types of data as well. In the example of FIG. 3, vertex storage 86 is illustrated as storing vertices V0-V6 (vertex V0 is stored twice in this example). The vertices of vertex storage 86 are illustrated as being stored by storage logic 88 in top-first, bottom-last order, with V0 being stored first, and V6 being stored last (i.e. most-recently in time).

Index storage 84 stores index values (indices). Each of the indices references or points to a single vertex stored in vertex storage 86 There is a one-to-one correspondence between an index of index storage 84 and a vertex of vertex storage 86. Each arrow indicates the particular vertex that an index points to or references. As an example, arrow 90 from I7 to V6 indicates that index I7 references, points to, or corresponds to vertex V6.

Reuse table 82 stores indices that correspond to, and are also stored in index storage 84. However, the number of indices stored in reuse table 82 may be smaller than the maximum number of indices that may be stored in index storage 84. When vertex data is to be written to indexed streamout buffer 29, storage logic 88 determines if any of the indices in reuse table 82 point to an index in index storage 84 that references the same vertex as the vertex to be stored, i.e. whether the vertices associated with the indices in reuse table 82 are already stored in vertex storage 86.

If the vertex to be stored is not referenced by any of the indices in reuse table 82, storage logic 88 stores the vertex in vertex storage 86. Storage logic 88 also generates and stores an index that refers to the vertex in index storage 84. Storage logic 88 also stores the generated index value in reuse table entry 82. In some instances, reuse table 82 may already contain a maximum number of entries (indices). In this instance, storage logic 88 overwrites the oldest index entry of reuse table 82 with the index that references the newly-stored vertex.

If reuse table 82 already includes an index value that references a vertex that is stored in vertex storage 86, storage logic 88 stores an index in index storage 84, and does not modify the reuse table. Storage logic 88 does not store a vertex in vertex storage 86. Additional examples illustrating the operation of indexed streamout buffer 29 will be illustrated in FIGS. 4A-C and 5A-D.

Figure 4A:
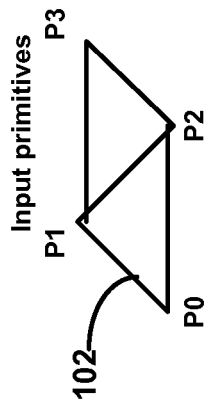
FIGS. 4A-4C are conceptual diagrams illustrating strips of triangle primitives that may be processed and generated by a geometry shader, and stored in, and streamed out from an indexed streamout buffer, e.g. indexed streamout buffer 29 or 47, in accordance with the techniques of this disclosure
Figure 4B:
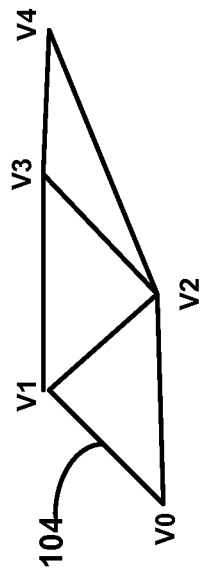
Figure 4C:
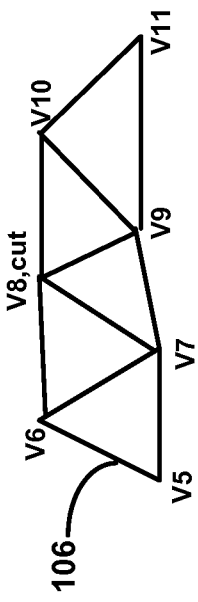

FIGS. 4A-4C are conceptual diagrams illustrating strips of triangle primitives that may be processed and generated by a geometry shader, and stored in, and streamed out from an indexed streamout buffer, e.g. indexed streamout buffer 29 or 47, in accordance with the techniques of this disclosure. The example primitives illustrated in FIGS. 4A-4C are utilized in further examples with respect to FIGS. 5A-5D.

FIG. 4A illustrates a triangle strip 102 comprising two triangle primitives. The first triangle has vertices (P0, P1, P2), and the second triangle has vertices (P1, P2, and P3). The strip illustrated in FIG. 4A may be input to a shader, such as geometry shader stage 28 (FIG. 1) or geometry shader stage 46 (FIG. 2). In some examples, the geometry shader may process the primitives of the strip, and may output a more detailed strip, such as strip 104 of FIG. 4B.

FIG. 4B illustrates another strip 104 comprising three triangle primitives. The first triangle has vertices (V0, V1, V2), the second triangle has vertices (V1, V2, V3), and the third triangle has vertices (V2, V3, and V4). The strip of FIG. 4B may be the output of the geometry shader after processing the triangle with vertices (P0, P1, P2) of FIG. 4A.

FIG. 4C illustrates a third strip 106 comprising five triangle primitives. The strip of FIG. 4C may also be the output of the geometry shader resulting from processing the triangle with vertices (P1, P2, P3) of FIG. 4A. The first primitive has vertices (V5, V6, V7), the second primitive has vertices (V6, V7, and V8). However, this triangle strip has a cut at vertex V8, which indicates that the strip is divided into two portions at vertex V8, i.e., V8 is the endpoint of one strip and vertex V9 begins a new strip. Because of the cut at V8, the primitives formed by vertices (V7, V8, and V9), and (V8, V9, and V10) are not stored in a buffer for streamout.

FIGS. 5A-5D are conceptual diagrams illustrating examples of storing vertex data in an indexed streamout buffer in accordance with the techniques of this disclosure, as well as the operation of a non-indexed streamout buffer. FIG. 5A is a conceptual diagram illustrating an input set of vertices.

Vertices 120 are a sequence of input vertices 120 that input assembler stage 18 or input assembler 36 may receive as input. Input vertices 120 comprise the set: (V0, V1, V2, V1, V3, V4, V1, V2, V3, V0, V4, V2, V2, V5, V6, V5, V2, V4, V5, V2, V6). Input vertices 120 may comprise some or all of the vertices of the primitives of FIGS. 4B and 4C.

Vertex shader stage 20, vertex shader 38, geometry shader stage 28 and/or geometry shader 46 may process vertices 120 to generate additional vertices corresponding to output vertices 122 of FIG. 5B primitives corresponding to the primitives of FIGS. 4B and 4C.

FIG. 5B is a conceptual diagram illustrating an output set of vertices. Output vertices 122 are to be written to a streamout buffer, which may be a non-indexed streamout buffer or an indexed streamout buffer, such as indexed streamout buffer 29, in accordance with the techniques of this disclosure. In the example of FIG. 5B, output vertices 122 form six primitives: primitive 124 (V0, V1, V2), primitive 126 (V2, V1, V3), primitive 128 (V3, V4, V2), primitive 130 (V5, V6, V7), primitive 132 (V7, V6, V8), and primitive 134 (V9, V10, V11). Each triangle primitive is denoted as a 3-tuple. Geometry shader 28 stores the output in a non-indexed streamout buffer in one example, and an indexed streamout buffer in another example.

FIG. 5C is a conceptual diagram illustrating a table that details the operation of an indexed streamout buffer in accordance with the techniques of this disclosure. FIG. 5C illustrates a table 140 that further details how output vertices 122 are written to an indexed streamout buffer in accordance with the techniques of this disclosure. The leftmost column of table 140 of FIG. 5C indicates the vertices of a primitive that a GPU, e.g. GPU 12 is attempting to write to indexed streamout buffer 29. The Reuse Table column indicates the current index entries of the reuse table, e.g. reuse table 82 of FIG. 3. For the purpose of this example, the reuse table has a size of four entries. The size of the reuse table may be larger or smaller than four entries, however. The vertices written column of table 140 indicates the actual vertices written (if any) to the vertex storage portion (e.g. vertex storage 86 of FIG. 3) of indexed buffer 29.

The table of FIG. 5C also includes "index filled size," "buffer filled size," "indices written," and "primitives written" columns. The first index filled size indicates the number of indices that have been written to indexed streamout buffer 29. The indices written column indicates which vertices have been written to index storage 84 of indexed streamout buffer 29. The Buffer filled size column value indicates a number of bytes consumed by the vertices written to indexed streamout buffer 29. In each entry of the "Buffer filled size" column, the number is followed by "V," which is representative of the number of bits or bytes that a vertex requires. For example, a vertex may comprise three 32-bit values, i.e. 96-bits per vertex. The primitives written column indicates the number of primitives written to indexed streamout buffer 29.

The "IndexFilledSize" column indicates a number of indices that storage logic 88 has attempted to write to index storage 84, and the "Indices Written" column indicates the actual number of indices written to index storage 84. Storage logic 88 increases the value of the IndexFilledSize value responsive to each storage request to indexed streamout buffer 29. Storage logic 88 only increases the value of the Indices Written value if storage logic 88 actually writes an index to index storage 84, i.e. if storage logic 88 has not stored a number of indices greater than or equal to the maximum index capacity of indexed streamout buffer 29.

A programmer or graphics API may query the value of IndexFilledSize to determine whether indexed streamout buffer 29 is currently full. More particularly, indexed streamout buffer 29 is allocated with an initial maximum vertex capacity, which an application may query. For example, an API call may allocate indexed streamout buffer 29 with n maximum index capacity of 100 indices. For each vertex storage request, storage logic 88 increases the value of IndexFilledSize and Indices Written by the number of indices stored in index storage 84.

However, once the written exceeds the maximum index capacity of indexed streamout buffer 29, storage logic 88 only continues to increase the value of IndexFilledSize in accordance with the number of indices that the application requests to write the buffer. Storage logic 88 does not increase the number of the "Indices Written" value, which indicates the actual number of indices written value to index storage 84. Thus, an application may query the values of IndexFilledSize and the number of indices written. If storage logic 88 determines that IndexFilledSize is greater than the number of indices written, the application may determine that indexed streamout buffer 29 is at maximum index capacity, and may cease writing indices to index storage 84.

The first row of table 140 of FIG. 5C corresponds to primitive 124 (vertices V0, V1, V2) being written to indexed streamout buffer 29. Because no vertices have been written to indexed streamout buffer 29 before this, reuse table 82, vertex storage 84, and index storage 86, are all empty. Storage logic 88 determines that none of the entries in the reuse table reference any of vertices V0, V1, and V2. Consequently, storage logic 88 writes V0, V1, and V2 to vertex storage 86, and generates indices I0, I1, and I2, which reference V0, V1, and V2. Storage logic 88 stores I0, I1, and I2 in reuse table 82, and in index storage 84. Storage logic 88 also updates the number of indices written to three, the buffer filled size to three vertices ("3V"), and the number of primitives written to one.

Next, storage logic 88 attempts to store primitive 126 (FIG. 5B), comprising vertices V2, V1, and V3 to indexed streamout buffer 29. The results of the storage are detailed in the second row of the table of FIG. 5C. In attempting to write primitive 126 to indexed streamout buffer 29, storage logic 88 determines whether any entries currently in the reuse table reference V2, V1, or V3.

Currently, Index I2, which references V2, and I1, which references V1, are stored in the reuse table. Because there is a reference in reuse table 82 for vertices V2 and V1, storage logic 88 writes indices I2 and I1 into index storage 84, but does not write any vertex data into vertex storage 86 for these vertices. Storage logic 88 determines that vertex V3 is not referenced by an index in the reuse table. Therefore, storage logic 88 stores vertex V3 in vertex storage 86. Storage logic 88 also generates index I3, which reference V3, and stores I3 in reuse table 82 and in index storage 84. Finally, storage logic 88 updates the number of indices written by adding three to the number of vertices written, bringing the total to 6. Storage logic 88 increments the number of vertices written by one (corresponding to V3 being written), and increments the number of primitives written to two.

Storage logic 88 subsequently attempts to store primitive 128 (FIG. 5B), comprising vertices V3, V4, and V2 to indexed streamout buffer 29. The results of the storage are detailed in the third row of the table of FIG. 5C. In attempting to write primitive 128 to indexed streamout buffer 29, storage logic 88 determines whether any entries currently in reuse table 82 reference V3, V4, or V2.

Currently, Index I3, which references V3, and I2, which references V2, are stored in reuse table 82. However, there is not an entry in reuse table 82 corresponding to V4. Because there is a reference in the reuse table for vertex V3, storage logic 88 writes indices I3 into index storage 84. Storage logic 88 next handles V4, by writing V4 to vertex storage 86, and generating an index I4 that references V4. Storage logic stores I4 in index storage 84, and overwrites the oldest entry of reuse table 82 (the oldest entry was I0). Storage logic 88 then writes I2, which references V2, to index storage 84. Finally, storage logic 88 updates the number of indices written by adding three to the number of indices written, bringing the total to 9. Storage logic 88 increments the number of vertices written by one (corresponding to V4 being written), bringing the total to five. Storage logic 88 also increments the number of primitives written to three.

Storage logic 88 next stores primitive 130 (FIG. 5B), comprising vertices V5, V6, and V7 to indexed streamout buffer 29. The results of the storage are detailed in the fourth row of the table of FIG. 5C. In attempting to write primitive 130 to indexed streamout buffer 29, storage logic 88 determines whether any entries currently in reuse table 82 reference V5, V7, or V7.

Currently, no indices that reference V5, V6, or V7 are stored in reuse table 82. Storage logic 88 handles V5, V6, and V7 by writing each of the vertices to vertex storage 86, and generating indices I5, I6, and I7, respectively. Because of the three new indices, I5, I6, and I7, storage logic 88 stores I5, I6, and I7 in index storage 84, and overwrites the three oldest entries of reuse table 82 (I1, I2, and I3). Finally, storage logic

88 updates the number of indices written by adding three to the number of indices written, bringing the total to 12, increments the number of vertices written by three, bringing the total to eight, and also increments the number of primitives written to four.

After writing primitive 130, storage logic 88 next stores primitive 132 comprising vertices V7, V6, and V8 to streamout buffer 29. The results of the storage are detailed in the fifth row of the table of FIG. 5C. In attempting to write primitive 132 to indexed streamout buffer 29, storage logic 88 determines whether any entries currently in reuse table 82 reference V7, V6, or V8.

Indices I7 and I6 reference V7 and V6, respectively. No index currently in reuse table 82 references V8. Because I7 and I6 reference V7 and V6, storage logic 88 writes indicates V7 and V6 to index storage 84. Because no index references V8, storage logic 88 stores V8 in vertex storage 86, and generates index I8. Storage logic 88 stores I8 in index storage 88, and overwrites the oldest index of reuse table 82 (I4) with I8. Finally, storage logic 88 updates the number of indices written by adding three to the number of vertices written, bringing the total to 15, increments the number of vertices written by one, bringing the total to nine, and also increments the number of primitives written to five.

After writing primitive 132, storage logic 88 next stores primitive 134, which is composed of vertices V9, V10, and V11, to streamout buffer 29. The results of the storage are detailed in the sixth and final row of the table of FIG. 5C. In attempting to write primitive 134 to indexed streamout buffer 29, storage logic 88 determines whether any entries currently in reuse table 82 reference V9, V10, or V11.

Currently, no indices that reference V9, V10, or V11 are stored in reuse table 82. Storage logic 88 handles V9, V10, and V11 by writing each of the vertices to vertex storage 86, and generating indices I9, I10, and I11, respectively. Because of the three new indices, I9, I10, and I11, storage logic 88 stores I9, I10, and I11 in index storage 84, and overwrites the three oldest entries of reuse table 82 (I5, I6, and 73). Storage logic 88 also updates the number of indices written by adding three to the number of vertices written, bringing the total to 18, increments the number of vertices written by three, bringing the total to 12, and also increments the number of primitives written to six.

FIG. 5D is a conceptual diagram illustrating the contents of a non-indexed streamout buffer and an indexed streamout buffer. FIG. 5D illustrates the difference in the contents of storing output primitives 122 to a non-indexed streamout buffer, versus an indexed streamout buffer. numeral 142 references the contents of a non-indexed streamout buffer. Non-indexed streamout buffer 142 simply stores all the vertices of output primitives 122, as they were generated by a geometry shader or another stage of the graphics pipeline. Non-indexed streamout buffer 142 does nothing to reduce the redundancy of the input vertex set, as V1, V2, V3, V6, and V7 are all stored multiple times in non-indexed buffer 142.

The contents of indexed streamout buffer 29 after storing output primitives 122 are illustrated the contents of index storage 144 and 146, respectively. Index storage 144 includes all of the indices written in table 140 of FIG. 5C. However, each index may be only a few bits, as compared to 64-bits per vertex coordinate stored. The number of indices stored is therefore equal to the number of entries in non-indexed streamout buffer 142. However, vertex storage 146 stores fewer vertices (12) than the 18 vertices sorted by non-indexed streamout buffer 142. Thus, relative to a non-indexed streamout buffer, streamout buffer 29 may reduce the amount of vertex data that is stored for streamout.

FIGS. 6A-6D are conceptual diagrams illustrating examples of storing vertex data in an indexed streamout buffer in accordance with the techniques of this disclosure, as well as the operation of a non-indexed streamout buffer. FIG. 6A is a conceptual diagram illustrating an input set of vertices. Input vertices 200 are a sequence of input vertices 200 that input assembler stage 18 or input assembler 36 may receive as input. Input vertices 200 comprise the set: (V0, V1, V2, V1, V3, V4, V1, V2, V3, V0, V4, V2, V2, V5, V6, V5, V2, V4, V5, V2, V6).

Vertex shader stage 20, vertex shader 38, geometry shader stage 28 and/or geometry shader 46 may process vertices 200 to generate additional vertices corresponding to output vertices 202 of FIG. 5B primitives corresponding to the primitives of FIG. 6B, which are stored in streamout buffer 29 as illustrated in greater detail in table 220 in FIG. 6C.

FIG. 6B is a conceptual diagram illustrating an output set of vertices. FIG. 6B illustrates an output set of vertices 202. Output vertices 202 are to be written to a streamout buffer, which may be a non-indexed streamout buffer or an indexed streamout buffer, such as streamout buffer 29, in accordance with the techniques of this disclosure. In the example of FIG. 6B, output vertices 202 form six primitives: primitive 204 (V0, V1, V2), primitive 206 (V1, V3, V4), primitive 208 (V1, V2, V3), primitive 210 (V0, V4, V2), primitive 212 (V2, V5, V6), primitive 214 (V5, V2, V6), and primitive 216 (V5, V2, V6). Each triangle primitive is denoted as a 3-tuple. Geometry shader 28 stores the output in a non-indexed streamout buffer in one example, and an indexed streamout buffer in another example.

FIG. 6C is a conceptual diagram illustrating a table that details the operation of an indexed streamout buffer in accordance with the techniques of this disclosure. FIG. 6C illustrates a table 220 that further details how output vertices 202 are written to an indexed streamout buffer in accordance with the techniques of this disclosure. As in FIG. 5C, the leftmost column of Table 220 indicates the vertices of a primitive that a GPU, e.g. GPU 12 is attempting to write to indexed streamout buffer 29. The Reuse Table column indicates the current index entries of the reuse table, e.g. reuse table 82 of FIG. 3. In this example, the reuse table has a size of four entries for the purpose of example. The size of the reuse table may be larger or smaller than four entries, however. The vertices written column of table 220 indicates the actual vertices written (if any) to the vertex storage portion (e.g. vertex storage 86 of FIG. 3) of indexed buffer 29.

The table of FIG. 6C also includes "index filled size," "buffer filled size," "indices written," and "primitives written" columns. The indices written column indicates which vertices have been written to index storage 84 of streamout buffer 29. The index filled size indicates the number of indices that have been written to streamout buffer 29. Buffer filled size indicates a number of vertices written to streamout buffer 29, and the primitives written column indicates the number of primitives written to streamout buffer 29. The number of vertices written is denoted as a number followed by the letter "V." In the examples of FIG. 6C, the V is representative of the number of bytes required to represent a vertex. For example, a three-dimensional vertex having three double-precision (i.e. 64-bit) floating point values may consume 3*64=192 bits per vertex, as one example. Other vertex sizes may also be possible. Storing the amount of bytes used to store the vertices may be used by storage logic 88, as well as by other GPU stages during indexed buffer streamout.

As described above, the Indices Written value indicates the number of indices that storage logic 88 has written to indexed streamout buffer 29, and IndexFilledSize indicates the number of vertices that storage logic 88 has attempted to write to indexed storage 88. If the value of IndexFilledSize exceeds the number of indices actually written, an application may determine that indexed streamout buffer 29 has reached its maximum index storage capacity (i.e. is full).

The first row of table 220 of FIG. 6C corresponds to primitive 204 (vertices V0, V1, V2) being written to streamout buffer 29. Because no vertices have been written to streamout buffer 29 before this, the reuse table, vertex storage, and index storage, are all empty. Storage logic 88 determines that none of the entries in the reuse table reference any of vertices V0, V1, and V2. Consequently, storage logic 88 writes V0, V1, and V2 to vertex storage 86, and generates indices I0, I1, and I2, which reference V0, V1, and V2. Storage logic 88 stores I0, I1, and I2 in reuse table 82, and in index storage 84. Storage logic 88 also updates the number of indices written to three, the buffer filled size to the size of three vertices ("3V"), and the number of primitives written to one.

Next, storage logic 88 attempts to store primitive 206 (FIG. 6B), comprising vertices V1, V3, and V4, to indexed streamout buffer 29. The results of the storage are detailed in the second row of the table of FIG. 6C. In attempting to write primitive 206 to indexed streamout buffer 29, storage logic 88 determines whether any entries currently in reuse table 82 reference V1, V3, or V4.

Currently, Index I1 references V1. Because there is an index in the reuse table that references vertex V1, storage logic 88 writes index I1 into index storage 84, but does not write any vertex data into vertex storage 86 for these vertices. Storage logic 88 determines that vertices V3 and V4 are not referenced by an index in reuse table 82. Therefore, storage logic 88 stores vertices V3 and V4 in vertex storage 86. Storage logic 88 also generates indices I3 and I4, which reference V3 and V4 respectively. Storage logic 88 stores I3 and I4 in reuse table 82 and in index storage 84. Finally, storage logic 88 updates the number of indices written by adding three to the number of vertices written, bringing the total to 6. Storage logic 88 increases the number of vertices written by two (corresponding to V3 and V4 being written), and increments the number of primitives written to two.

Next, storage logic 88 attempts to store primitive 208 (FIG. 5C), comprising vertices V1, V2, and V3 to streamout buffer 29. The results of the storage are detailed in the third row of the table of FIG. 5C. In attempting to write primitive 208 to indexed streamout buffer 29, storage logic 88 determines whether any entries currently in the reuse table reference V1, V2, or V3.

Currently, Index I1, which references V1, I2, which references V2, and I3, which references V3, are each stored in reuse table 82. Because there is an index in reuse table 82 that references vertices V1, V2, and V3, storage logic 88 writes indices I1, I2, and I3 into index storage 84, but does not write any vertex data into vertex storage 86 for these vertices. Storage logic 88 also updates the number of indices written by adding three to the number of vertices written, bringing the total to 9. Storage logic 88 does not increment the number of vertices written because only indices and no vertices were written to indexed streamout buffer 29, and increments the number of primitives written to three.

Storage logic 88 subsequently attempts to store primitive 210 (FIG. 5B), comprising vertices V0, V4, and V2 to streamout buffer 29. The results of the storage are detailed in the fourth row of the table of FIG. 6C. In attempting to write primitive 210 to indexed streamout buffer 29, storage logic 88 determines whether any entries currently in reuse table 82 reference V0, V4, or V2.

Currently, none of the indices in reuse table 82 reference V0. Therefore, storage logic 88 stores V0 in vertex storage 86, and generates a new index (I0) that references V0. Storage logic 88 stores V0 in index storage 84 and in reuse table 82, overwriting the oldest entry (I1) with I0. Because I4 and I2, which reference V4 and V2, are currently stored in reuse table 82, storage logic 88 stores I4 and I2 in index storage 84. Finally, storage logic 88 updates the number of indices written by adding three to the number of indices written, bringing the total to 9. Storage logic 88 increments the number of vertices written by one (corresponding to V0 being written), bringing the total to six. Storage logic 88 also increments the number of primitives written to four.

Storage logic 88 next stores primitive 212 (FIG. 6B), comprising vertices V2, V5, and V6 to streamout buffer 29. The results of the storage are detailed in the fourth row of the table of FIG. 6C. In attempting to write primitive 212 to indexed streamout buffer 29, storage logic 88 determines whether any entries currently in reuse table 82 reference V2, V5, or V7.

Currently, reuse table 82 stores I2, which references V2. No indices currently in reuse table 82 reference V5 or V6. Because I2 references V2, storage logic 88 stores I2 in index storage 84. For vertices V5 and V6, storage logic 88 generates indices I5 and I6, respectively, and stores I5 and I6 in index storage 84, as well as in reuse table 82. Storage logic 88 overwrites the oldest entries of reuse table 82, I3, and I4, with I5, and I6, respectively. Finally, storage logic 88 updates the number of indices written by adding three to the number of indices written, bringing the total to 12, increments the number of vertices written by two, bringing the total to eight, and also increments the number of primitives written to five.

Storage logic 88 subsequently attempts to store primitive 214 (FIG. 6B), comprising vertices V5, V2, and V4 to streamout buffer 29. The results of the storage are detailed in the fourth row of the table of FIG. 6C. In attempting to write primitive 214 to indexed streamout buffer 29, storage logic 88 determines whether any entries currently in reuse table 82 reference V5, V2, or V4.

Index I5 in reuse table 82 references V5, and I2 references V2. Therefore, storage logic 88 stores I5, followed by I2 in vertex storage 84. Storage logic 88 determines that none of the indices in reuse table 82 reference V4. Therefore, storage logic 88 stores V4 in vertex storage 86, and generates Index I4, which references V4. Storage logic stores I4 in index storage 84, as well as in reuse table 82, and replaces the oldest entry, I0. Additionally, storage logic 88 updates the number of indices written by adding three to the number of indices written, bringing the total to eighteen. Storage logic 88 increments the number of vertices written by one (corresponding to V4 being written), bringing the total to nine. Storage logic 88 also increments the number of primitives written to four.

In this example, the last primitive that storage logic 88 subsequently attempts to store is primitive 216 (FIG. 6B), comprising vertices V5, V2, and V6 to streamout buffer 29. The results of the storage are detailed in the seventh (last) row of the table of FIG. 6C. In attempting to write primitive 214 to indexed streamout buffer 29, storage logic 88 determines whether any entries currently in reuse table 82 reference V5, V2, or V6.

Indices I5, I2, and I6 in reuse table 82 reference V5, V2, and V6, respectively. Therefore, storage logic 88 stores I5, followed by I2, and finally I6 in index storage 84. Storage logic 88 also increases the number of indices written by three, bringing the total to 21, and increments the number of primitives written to seven. No vertices are written as a result of attempting to store 216, so storage logic 88 does not change the number of vertices stored in table 220.

FIG. 6D is a conceptual diagram illustrating the contents of a non-indexed streamout buffer and an indexed streamout buffer. FIG. 6D illustrates the difference in the contents of storing output primitives 202 to a non-indexed streamout buffer, versus an indexed streamout buffer. Numeral 242 references the contents of a non-indexed streamout buffer. Non-indexed streamout buffer 242 simply stores all the vertices of output primitives 202, as they were generated by a geometry shader or another stage of the graphics pipeline. Non-indexed streamout buffer 242 does nothing to reduce the redundancy of the input vertex set, as V1, V2, V3, and V6, are all stored multiple times in non-indexed buffer 242.

The contents of indexed streamout buffer 29 after storing output primitives 202 are illustrated the contents of index storage 244 and 246, respectively. Index storage 244 includes all of the indices written in table 220 of FIG. 5C. However, each index may be only a few bits, as compared to 64-bits per vertex coordinate stored. The number of indices stored is therefore equal to the number of entries in non-indexed streamout buffer 242. However, vertex storage 242 stores fewer vertices (nine) than the 21 vertices sorted by non-indexed streamout buffer 242. Thus, relative to a non-indexed streamout buffer, streamout buffer 29 may reduce the amount of vertex data that is stored for streamout.

FIG. 7 is an illustration of a sample draw call of an application programming interface that implements techniques for utilizing an indexed streamout buffer in accordance with the techniques of this disclosure. The example of FIG. 7 illustrates some lines of code, lines 300, 302, and 304. Each of the lines of code may be executable by GPU 12 (FIG. 1 and FIG. 2) and indexed streamout buffer 29. Lines 300, 302, and 304 may also be part of, or an extension of a programming language, or graphics API, such as OpenGL, OpenCL, DirectX, or another graphics API.

In order to utilize an indexed streamout buffer, a program may explicitly specify that an indexed streamout buffer is to be used to store vertex data. Line 300 performs an allocation of a vertex buffer using a CreateBuffer method call, which is part of DirectX. The CreateBuffer method call takes three arguments: a bufferDesc argument, an initData argument, and a pointer that will reference the vertex buffer once the allocation is complete.

In order to allocate an indexed buffer as opposed to a non-indexed buffer, an application must specify, e.g. using the bufferDesc argument, that the buffer should be an indexed buffer. The bufferDesc argument in this example may have a type of D3D11_BUFFER DESC (or another struct type in versions other than DirectX 11), which is a struct that defines a description of the vertex buffer to be allocated. The bufferDesc struct may have a BindFlags member. An application may set the value of the bufferDesc.Bindflags member to specify that the buffer to be allocated should be an indexed buffer that is used for streamout, rather than a non-indexed buffer.

As described above, after GPU 12 stores vertices to an indexed streamout buffer, the indexed streamout buffer may streamout the vertices back to a preceding stage to be used in additional rendering pass. For example, streamout buffer 29 may streamout vertices to input assembler stage 18 for use as input in a second, rendering pass of a tile-based GPU architecture.

To specify that a stage of GPU 12 should consume the contents of an indexed streamout buffer 29, an application invokes a special draw command that takes the indexed streamout buffer as input. The draw call may be named "DrawAutoIndexed," and is referenced by numeral 302 in FIG. 7. DrawAutoIndexed may take as arguments: a pointer to an indexed streamout buffer, as well as a primitive type. The pointer to the vertex buffer is "g_pVertexBuffer," and the variable "primType" specifies the primitive type of all the vertices stored in the indexed streamout buffer.

When GPU 12 executes the DrawAutoIndexed call, indexed streamout buffer 29 streams out both the indices stored in index storage 84, as well as the vertices stored in vertex storage 86. It is up to the consuming stage of the GPU pipeline, e.g. input assembler stage 18 to reconstruct the original sequence of vertices based on the streamed-out indices and vertices, as well as the primitive type specified in the DrawAutoIndexed call. In some examples, the consuming stage may reconstruct the original sequence of vertices in hardware.

Streamout buffer 29 may also have some maximum number of indices that it may store. To determine whether all vertices that GPU 12 attempts to write actually get written to streamout buffer 29, streamout buffer 29 may expose two variables: (1) an "IndexNeeded", and (2) an "IndexFilledSize" variable, which indicates the maximum index capacity of indexed streamout buffer 29. Whenever storage logic 88 increases the IndexNeeded variable by the number of indices written when writing one or more indices to index storage 84.

If the IndexNeeded variable exceeds the value of IndexFilledSize, storage logic 88, is able to determine that indexed streamout buffer 29 is full, and cannot store additional indices. Any attempts to store more vertices than indexed streamout buffer 29 will fail if IndexNeeded is greater than IndexFilledSize. Storage logic 88 also ensures that if GPU 12 attempts to write a primitive to indexed streamout buffer 29, and indexed streamout buffer 29 has insufficient index capacity and/or vertex capacity to store all the indices and vertices of the primitive, but could store some of the indices, that none of the indices or primitives (e.g. vertices) get stored to indexed streamout buffer 29. An application executing on GPU 12 may query the IndexNeeded and IndexFilledSize parameters of streamout indexed buffer 29.

Also, in various examples, an application may streamout from one or more indexed buffers and one or more non-indexed buffers. However, each streamout from a non-indexed buffer may require one type of method call (e.g., a DrawAuto method call), whereas each streamout from an indexed buffer may require a call to the different DrawAutoIndexed method call.

Figure 8:
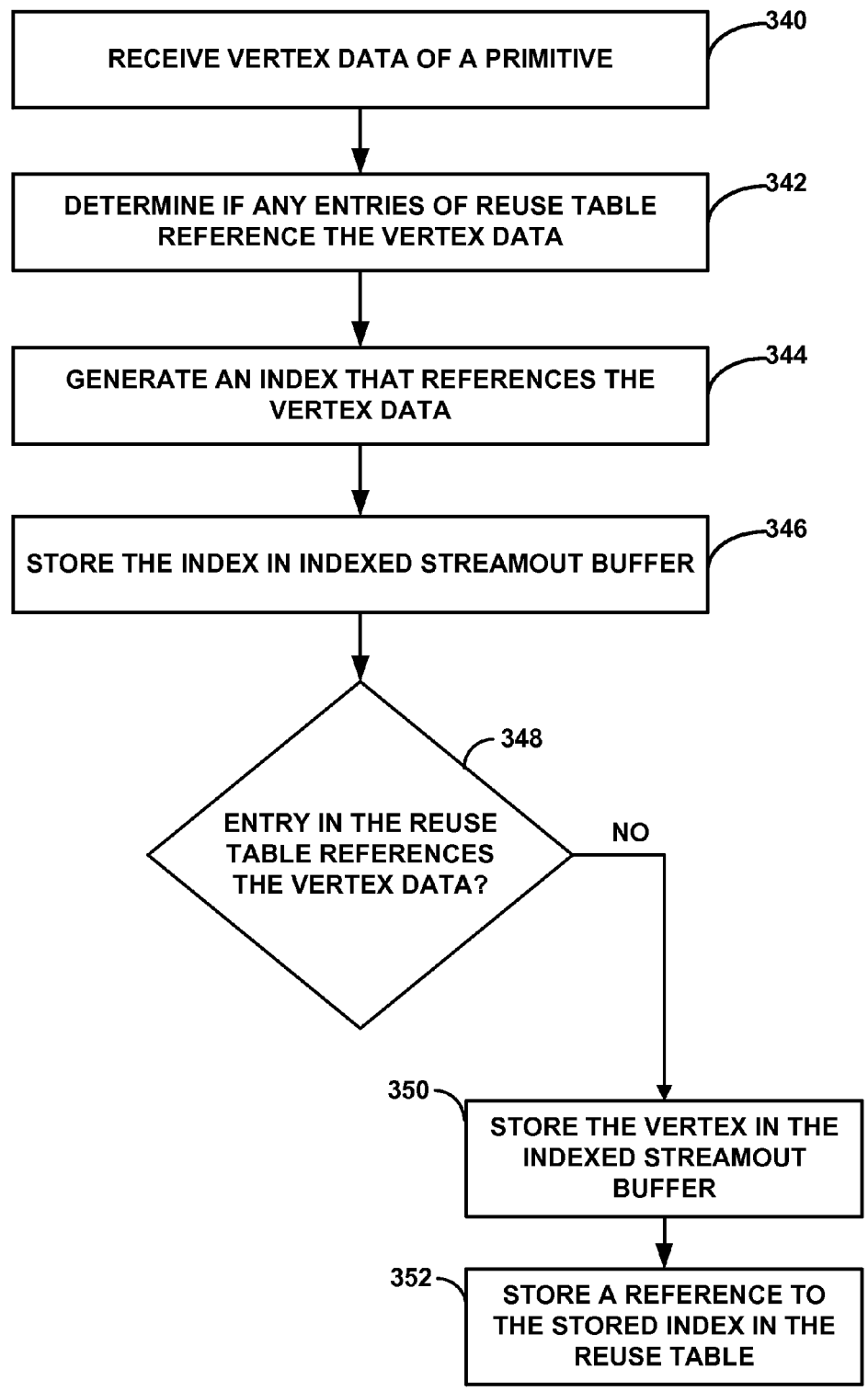
FIG. 8 is a flowchart illustrating a process of storing vertex data to an indexed streamout buffer in accordance with the techniques of this disclosure.

FIG. 8 is a flowchart illustrating a process of storing vertex data to an indexed streamout buffer in accordance with the techniques of this disclosure. It should be understood that for the purposes of example, the techniques of the method of FIG. 8 may be performed by GPU 12 and indexed streamout buffer 29. However, other components, processors, etc. may perform the techniques of the method of FIG. 8.

In the example of FIG. 8, indexed streamout buffer 29 of GPU 12 may receive vertex data (e.g. vertices) of a primitive, e.g., from a shader, such as a geometry shader 28 or vertex shader 20 (340). Indexed streamout buffer 29 may determine whether any entries of reuse table 82 reference the vertex data (342). Index streamout buffer 29 may generate an index that references the vertex data (344), and store the index in the indexed streamout buffer (346). Responsive to determining that an entry of the entries currently stored in reuse table 82 does not reference the vertex data ("No" branch of decision block 348), storage logic 88 may store the vertex data in vertex storage 86 of indexed streamout buffer 29 (350), storage logic 88 may further store a reference to the stored index in reuse table 82 (352).

In some examples, the entries of the reuse table are associated with vertices stored in the vertex buffer. In this example, storing a reference in the reuse table comprises: determining whether the reuse table is full, and responsive to determining that the reuse table is full, overwriting an oldest entry of the reuse table with the reference to the stored index.

In various examples, indexed streamout buffer 29 may have a maximum capacity, and a current index capacity. Indexed streamout buffer 29 may be further configured to determine whether storing an index that references the vertex data will exceed the maximum index capacity. Responsive to determining that storing the index will exceed the maximum index capacity, storage logic 88 may mark the indexed streamout buffer as full, and prohibit additional vertex data and indices from being stored by the streamout indexed buffer.

In various examples, indexed streamout buffer 29 may be further configured to store, in the indexed buffer, a number of primitives written to the indexed buffer. Indexed streamout buffer 29 may also be configured to stream out the vertex data to a pipeline stage of GPU 12.

In another example, to responsive to storing the index, storage logic 88 of indexed streamout buffer 29 may be configured to increase a count of indices stored in the index buffer. In another example, the method of FIG. 8 may include executing a draw call that specifies the indexed buffer is used for streaming out the stored vertex, and in some examples, the draw call may specify the indexed buffer as a streamout argument, and/or a primitive type.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored as one or more instructions or code on a computer-readable medium. Computer-readable media may include computer data storage media. Data storage media may be any available media that can be accessed by one or more computers or one or more processors to retrieve instructions, code and/or data structures for implementation of the techniques described in this disclosure. By way of example, and not limitation, such computer-readable media can comprise random access memory (RAM), read-only memory (ROM), EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
receiving, by an indexed streamout buffer accessible by a graphics processing unit (GPU), vertex data of a particular primitive, wherein the indexed streamout buffer includes index storage for storing a first number of index values, a reuse table for storing a second number of index values with the second number of index values being smaller than the first number of index values, and vertex storage for storing vertex data corresponding to one or more primitives, and wherein each index value uniquely references vertex data stored in the vertex storage;

determining, by the GPU based on storage logic of the indexed streamout buffer, if any index value stored in the reuse table of the indexed streamout buffer references the vertex data of the particular primitive;

generating, by the GPU based on the storage logic of the indexed streamout buffer, an index value that references the vertex data of the particular primitive;

storing, by the GPU based on the storage logic of the indexed streamout buffer, the generated index that references the vertex data of the particular primitive in the index storage of the indexed streamout buffer; and responsive to determining that any index value stored in the reuse table does not reference the vertex data of the particular primitive:
storing, by the GPU based on the storage logic of the indexed streamout buffer, the vertex data of the particular primitive in the vertex storage of the indexed streamout buffer; and
storing, by the GPU based on the storage logic of the indexed streamout buffer, the generated index that references the vertex data of the particular primitive in the reuse table of the indexed streamout buffer.

2. The method of claim 1,
wherein storing the generated index that references the vertex data of the particular primitive in the reuse table of the indexed streamout buffer comprises:
determining whether the reuse table is full; and
responsive to determining that the reuse table is full, overwriting an oldest index value of the reuse table with the generated index that references the vertex data of the particular primitive.

3. The method of claim 1, wherein the index storage of the indexed streamout buffer has a maximum index capacity, and a current index capacity, the method further comprising:
determining, by the GPU based on the storage logic of the indexed streamout buffer, whether storing the index value that references the vertex data of the particular primitive in the index storage of the indexed streamout buffer will exceed the maximum index capacity of the index storage; and responsive to determining, by the GPU based on the storage logic of the indexed streamout buffer, that storing the index value will exceed the maximum index capacity of the index storage:

marking the indexed streamout buffer as full; and
prohibiting additional vertex data and index values from being stored in the indexed streamout buffer.

4. The method of claim 1, further comprising:
storing in the indexed streamout buffer, by the GPU based on the storage logic of the indexed streamout buffer, a number of primitives written to the indexed streamout buffer.

5. The method of claim 1, further comprising: streaming out the vertex data from the indexed streamout buffer to a pipeline stage of the GPU.

6. The method of claim 1, further comprising:
responsive to storing the vertex data of the particular primitive in the vertex storage of the indexed streamout buffer, increasing a count of vertices stored in the indexed streamout buffer.

7. The method of claim 1, further comprising:
responsive to storing the index value that references the vertex data of the particular primitive in the index storage of the indexed streamout buffer, increasing a count of index values stored in the indexed streamout buffer.

8. The method of claim 5, wherein streaming out the vertex data from the indexed streamout buffer further comprises:
executing a draw call that specifies the indexed streamout buffer is used for streaming out the vertex data from the indexed streamout buffer.

9. The method of claim 1, further comprising:
executing a draw call that specifies the indexed streamout buffer as an argument.

10. The method of claim 8, wherein the draw call specifies a primitive type.

11. A graphics processing unit (GPU) comprising:
at least one processor; and
an indexed streamout buffer accessible by the at least one processor, wherein the indexed streamout buffer includes index storage for storing a first number of index values, a reuse table for storing a second number of index values with the second number of index values being smaller than the first number of index values, and vertex storage for storing vertex data corresponding to one or more primitives, and wherein each index value uniquely references vertex data stored in the vertex storage, wherein, based on storage logic of the indexed streamout buffer, the at least one processor is configured to:

determine if any index value stored in the reuse table of the indexed streamout buffer references vertex data of a particular primitive;

generate an index value that references the vertex data of the particular primitive;

store the generated index that references the vertex data of the particular primitive in the index storage of the indexed streamout buffer; and responsive to determining that any index value stored in the reuse table does not reference the vertex data of the particular primitive:

store the vertex data of the particular primitive in the vertex storage of the indexed streamout buffer; and store the generated index that references the vertex data of the particular primitive in the reuse table of the indexed streamout buffer.

12. The GPU of claim 11,
wherein to store the generated index that references the vertex data of the particular primitive in the reuse table of the indexed streamout buffer, least one processor is, based on the storage logic of the indexed streamout buffer, further configured to:

determine whether the reuse table is full; and
responsive to determining that the reuse table is full, overwrite an oldest index value of the reuse table with the generated index that references the vertex data of the particular primitive.

13. The GPU of claim 11, wherein the index storage of the indexed streamout buffer has a maximum index capacity, and a current index capacity, the at least one processor is, based on the storage logic of the indexed streamout buffer, further configured to:

determine whether storing the index value that references the vertex data of the particular primitive in the index storage of the indexed streamout buffer will exceed the maximum index capacity of the index storage; and responsive to determining that storing the index value will exceed the maximum index capacity of the index storage:

mark the indexed streamout buffer as full; and
prohibit additional vertex data and index values from being stored in the indexed streamout buffer.

14. The GPU of claim 11, wherein the at least one processor is, based on the storage logic of the indexed streamout buffer, further configured to:

store in the indexed streamout buffer a number of primitives written to the indexed streamout buffer.

15. The GPU of claim 11, wherein the at least one processor is, based on the storage logic of the indexed streamout buffer, further configured to:

stream out the vertex data from the indexed streamout buffer to a pipeline stage of the GPU.

16. The GPU of claim 11, wherein the at least one processor is, based on the storage logic of the indexed streamout buffer, further configured to:

responsive to storing the vertex data of the particular primitive in the vertex storage of the indexed streamout buffer, increase a count of vertices stored in the indexed streamout buffer.

17. The GPU of claim 11, wherein the at least one processor is, based on the storage logic of the indexed streamout buffer, further configured to:

responsive to storing the index value that references the vertex data of the particular primitive in the index storage of the indexed streamout buffer, increase a count of index values stored in the indexed streamout buffer.

18. The GPU of claim 11, wherein to stream out the vertex data from the indexed streamout buffer, the at least one processor is, based on the storage logic of the indexed streamout buffer, further configured to:

execute a draw call that specifies the indexed streamout buffer is used for streaming out the vertex data from the indexed streamout buffer.

19. The GPU of claim 11, wherein the at least one processor is further configured to:

execute a draw call that specifies the indexed streamout buffer as an argument.

20. A non-transitory computer-readable storage medium having instructions stored thereon that, when executed, cause at least one processor to:

determine if any index value stored in a reuse table of an indexed streamout buffer references vertex data of a particular primitive, wherein the indexed streamout buffer includes index storage for storing a first number of index values, the reuse table for storing a second number of index values with the second number of index values being smaller than the first number of index values, and vertex storage for storing vertex data corresponding to one or more primitives, and wherein each index value uniquely references vertex data stored in the vertex storage;

generate an index value that references the vertex data of the particular primitive;

store the generated index that references the vertex data of the particular primitive in the index storage of the indexed streamout buffer; and responsive to determining that any index value stored in the reuse table does not reference the vertex data of the particular primitive:

store the vertex data of the particular primitive in the vertex storage of the indexed streamout buffer; and store the generated index that references the vertex data of the particular primitive in the reuse table of the indexed streamout buffer.

* * * * *